United States Patent [19]

Zampiello et al.

[11] 4,397,027
[45] Aug. 2, 1983

[54] SELF-COMPENSATING GAS DISCHARGE PATH FOR LASER GYRO

[75] Inventors: Albert N. Zampiello, Boxboro; James B. Matthews, Wayland, both of Mass.

[73] Assignee: Raytheon Company, Lexington, Mass.

[21] Appl. No.: 222,394

[22] Filed: Jan. 5, 1981

[51] Int. Cl.³ .............................................. H01S 3/081
[52] U.S. Cl. ........................................ 372/94; 356/350
[58] Field of Search ............................ 372/92, 94, 93; 356/350

[56] References Cited

U.S. PATENT DOCUMENTS

| | | | |
|---|---|---|---|
| 3,741,657 | 6/1973 | Andringa | 356/106 LR |
| 3,826,575 | 7/1974 | Walter, Jr. | 356/106 LR |
| 3,854,819 | 12/1974 | Andringa | 356/106 LR |
| 3,869,210 | 3/1975 | Fletcher et al. | 356/106 LR |
| 3,941,481 | 3/1976 | Kramer | 356/106 LR |
| 4,000,947 | 1/1977 | Grant, Jr. | 356/106 LR |
| 4,006,989 | 2/1977 | Andringa | 356/106 LR |
| 4,017,187 | 4/1977 | Schwartz | 356/106 LR |
| 4,035,081 | 7/1977 | Sepp et al. | 356/106 LR |
| 4,115,004 | 9/1978 | Hutchings et al. | 356/106 LR |
| 4,120,587 | 10/1978 | Vali et al. | 356/106 LR |
| 4,120,588 | 10/1978 | Chaum | 356/106 LR |
| 4,229,106 | 10/1980 | Dorschner | 356/350 |

Primary Examiner—William L. Sikes
Assistant Examiner—Leon Scott, Jr.
Attorney, Agent, or Firm—Walter F. Dawson; Joseph D. Pannone

[57] ABSTRACT

A ring laser gyroscope having a self-compensating discharge path between a single anode and cathode which comprises equal segments in the laser path in series with a channel that interconnects the laser path and allows a single current to flow within the equal segments in opposite directions with respect to the laser beam thereby cancelling the Fresnel-Fizeau drag effect. This design is applicable also to laser gyroscopes having two or more rings in a single gyro block structure.

10 Claims, 12 Drawing Figures

SELF-COMPENSATING GAS DISCHARGE PATH FOR LASER GYRO

BACKGROUND OF THE INVENTION

This invention relates to laser gyroscopes employing waves of two or more different frequencies within a laser gyroscope cavity. More particularly, the invention relates to cancelling the Fresnel-Fizeau drag effect resulting from the phenomenon of Langmuir flow which otherwise causes gyro output bias drift.

In general, laser gyroscopes devices have two or more waves traveling in opposite directions along a closed path including a laser gain medium so that rotation of the device about an axis within the path causes the path length for oppositely rotating waves to differ depending upon the rate of rotation. With a two wave or frequency system, it has been found that, for low rates of rotation corresponding to a small theoretical difference frequency, the actual output difference frequency is zero or substantially less than would be expected due to the phenomena known as lock-in. It is believed that the lock-in problem arises because of coupling between the waves which may arise from a number of possible factors including back scattering of laser energy from elements within the laser path such as reflectors or a polarization dispersive structure or from scattering centers within the laser gain medium itself.

One of the most significant laser gyroscopes yet proposed and constructed employs four waves of two pairs each propagating in opposite directions. Such systems are shown and described in U.S. Pat. Nos. 3,741,657 and 3,854,819 to Keimpe Andringa and assigned to the present assignee, the specifications of those patents being herein incorporated by reference. In such laser systems, circular polarization for each of the four waves is used. The pair of waves, or beams, propagating in the clockwise direction includes both lefthand circularly polarized (LCP) waves and right-hand circularly polarized (RCP) waves as does that propagating in the counterclockwise direction. This four-frequency or multi-oscillator ring laser gyro provides a means of circumventing the lock-in problem present in all conventional or two-frequency laser gyroscopes. This approach may be described as two independent laser gyros operating in a single stable resonator cavity, sharing a common optical path, but statically biased in opposite senses by the same passive bias element. In the differential output of these two gyros, the bias then cancels, while any rotation-generated signals add, thereby avoiding the usual problems due to drifts in the bias and giving a sensitivity twice that of a single two-frequency gyro. Because the bias need not be dithered, the gyro never passes through lock-in. Hence, there are no dither-induced errors to limit instrument performance. For this reason, the four-frequency gyro is intrinsically a low noise instrument, and it is well suited for applications requiring rapid position update or high resolution.

The speed of light propagating in a moving medium depends on the velocity of the moving medium. In a laser gyroscope, a moving medium will drag the resonant light frequencies or laser beam waves along with the medium producing a frequency shift effectively simulating a rotation rate. This frequency shift is the Fresnel-Fizeau drag effect resulting in a gyro output bias.

A helium-neon gas discharge within a laser gyroscope is such a moving medium. The phenomenon of Langmuir flow, in which the heavy ions in the plasma are more strongly coupled to the walls of the gas-discharge tube than are the electrons, results in a net flow of gas down the center of the tube toward the cathode and a return flow along the walls in the opposite direction. Thus, there is a large gradient of velocity within a laser gyroscope cavity bore.

The Fresnel-Fizeau drag effect has been one of the earliest recognized error sources affecting two-frequency as well as multi-frequency laser gyroscopes. One prior art approach has been attempted to suppress or cancel said drag effect by a perfectly symmetric split discharge approach whereby a precise electronic current source (supplied to two anodes) is required to maintain equality of electric current flowing in each half of the split discharge path, but in opposite directions. The traveling resonant light frequencies encounter the gas flows set up by the split discharge currents and the drag effect of one discharge current tends to cancel the drag effect of the other discharge current.

Another approach in the prior art has provided for the generation of low frequency amplitude modulated currents to each of two anodes of a two-frequency ring laser gyro to produce a modulation in the speed of the gas discharge flow that results in a cancellation of the Fizeau effect. This approach, however, requires considerable electronic circuitry external to the optical ring laser cavity.

This invention causes the cancellation of the Fresnel-Fizeau drag effects on the resonant light frequencies without the need for two anodes and associated precision electronics external to the ring laser cavity.

SUMMARY OF THE INVENTION

The invention discloses a laser gyroscope having a closed path with a gain medium for the propagation of a plurality of waves in opposite directions, each of said waves being of a different frequency in the electromagnetic spectrum, a channel within said closed path which provides an electrical discharge current path between one anode and one cathode for exciting said laser gain medium comprising a mixture of helium and neon, and said discharge current flowing in portions of said closed path encounters said plurality of waves in the same and opposite directions with respect to said waves thereby cancelling the Fresnel-Fizeau drag effect which otherwise manifests itself as a bias at the gyro output. In addition, a plurality of reflectors are included in said closed path for directing said waves around said path, magneto-optical means provide non-reciprocal bias for said electromagnetic waves, and a non-planar closed path supports left-hand and right-hand circularly polarized waves.

The channel in the preferred embodiment is preferably located at the intersection of a first plane comprising a first section of said electromagnetic waves and a second plane comprising a second section of said waves. Such a nonplanar closed path provides frequency splitting between LCP waves and RCP waves. In addition to the Fresnel-Fizeau drag cancellation improvement resulting from a self-compensating discharge path, a single discharge current allows the cathode in said cavity to be made smaller. The discharge current path of two or more optical cavities or laser rings may be connected in series permitting said discharge current to flow through multiple axes or more than one laser ring using only one cathode and one anode.

The invention further discloses a multiple axes laser gyroscope having two or more closed paths each with a gain medium for the propagation of a plurality of waves in opposite directions, each of said waves within a closed path being of a different frequency, means for exciting said laser gain medium by producing an electrical discharge current flow between one anode and one cathode in said medium comprising a mixture of helium and neon, means for directing said single discharge current flow within portions of each of said closed paths to encounter said plurality of waves in the same and opposite directions with respect to said waves, means for interconnecting said closed paths for providing a path for said discharge current to flow between said closed paths, and gyro block means comprising one or more of said closed paths. A plurality of reflectors are included in each of said closed paths for directing said waves around said paths, magneto-optical means in each path provide non-reciprocal bias for said electromagnetic waves, and a nonplanar closed path supports left-hand and right-hand circularly polarized waves. The directing means for said discharge current flow preferably comprises a channel interconnecting two points within each of said paths along the intersection of a first plane comprising a first section of said waves and a second plane comprising a second section of said waves. Bore means provide a path for said single discharge current to flow between said closed paths when enclosed in a single gyro block structure.

The present invention further discloses a laser gyroscope block having two or more separate and independent closed paths, each with a gain medium for the propagation of a plurality of electromagnetic waves in opposite directions, each of said waves within a closed path being of a different frequency, means for exciting said laser gain medium in each of said closed paths by providing a single electrical discharge current flow in said medium between an anode and a cathode in each closed path and means for directing said single discharge current flow within portions of each of said closed paths to encounter said plurality of waves in each of said closed paths in the same and opposite directions with respect to said waves. A plurality of reflectors are included in each of said closed paths for directing said waves around said paths, magneto-optical means in each path provide non-reciprocal bias for said electromagnetic waves and a nonplanar closed path supports left-hand and right-hand circularly polarized waves. The directing means for said discharge current flow preferably comprises a channel interconnecting two points within each of said paths along the intersection of a first plane comprising a first section of said waves and a second plane comprising a second section of said waves.

BRIEF DESCRIPTION OF THE DRAWINGS

Other and further features and advantages of the invention will become apparent in connection with the accompanying drawings wherein.

DESCRIPTION OF THE PREFERRED EMBODIMENT

Figure 1:
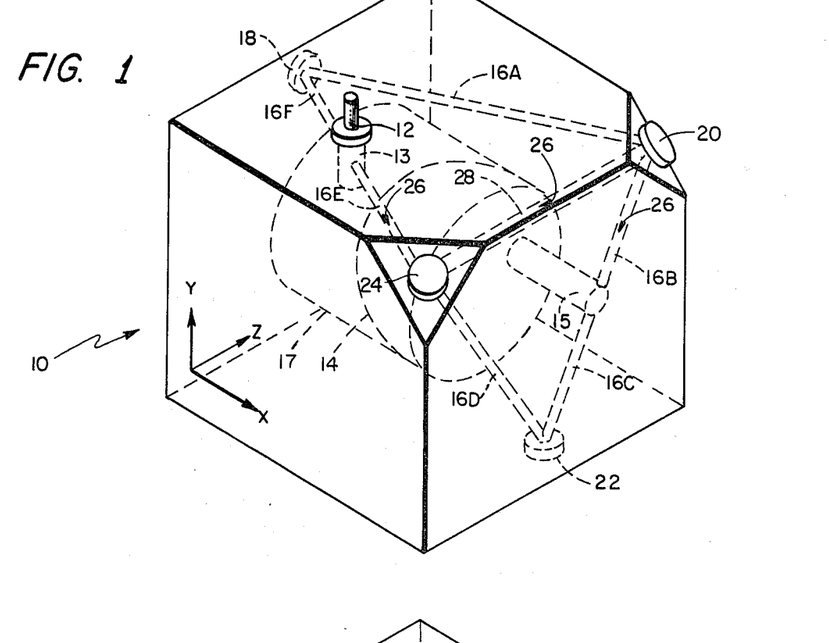
FIG. 1 is an isometric drawing of a single axis ring laser gyroscope optical block embodying the invention.

Referring first to FIG. 1, there is shown a diagram of a laser gyroscope optical block 10 having an anode 12, an anode bore 13, a cathode 14 inside a cathode cavity 17, a cathode bore 15 and a ring path 16A, 16B, 16C, 16D, 16E and 16F for the laser beams produced by four reflectors 18, 20, 22 and 24. A channel 28 between reflectors 20 and reflector 24 and in series with laser paths 16B and 16E provides a single self-compensating gas discharge path between the anode 12 and cathode 14 for a laser gain medium 26 having a helium-neon gas mixture. A mixture $^3$He, $^{20}$Ne, and $^{22}$Ne in the ratio of 8:0.53:0.47 is preferred, although other mixtures are equally feasible. The cathode bore 15 provides a connective path between the ring path segments 16B and 16C and the cathode 14; the anode bore 13 provides a connective path between the ring path segments 16E and 16F and the anode 12.

Gyro block 10 is preferably constructed with a material having a low thermal coefficient of expansion such as a glass-ceramic material to minimize the effects of temperature change upon a laser gyroscope system. A preferred commercially available material is sold under the name of Cer-Vit TM material C-101 by Owens-Illinois Company, alternatively, Zerodur by Schott may be used.

Figures 2, 3:
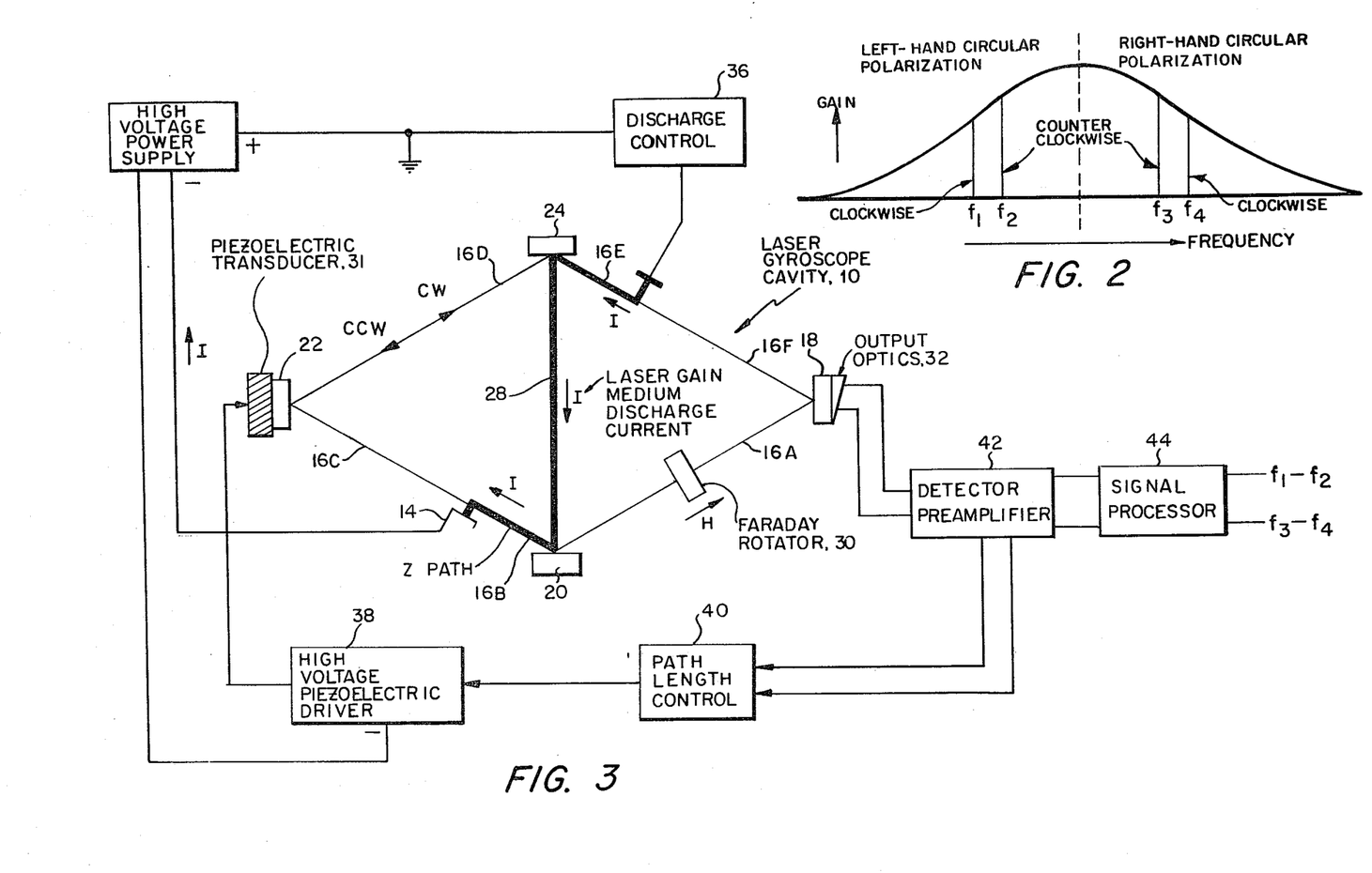
FIG. 2 illustrates a diagram of operating characteristics of a multi-oscillator ring laser gyroscope illustrated in FIG. 1.
FIG. 3 is a block diagram of a multi-oscillator ring laser gyroscope system embodying the present invention.

The laser gyroscope block for the preferred embodiment, employing four waves or frequencies, operates in the manner described in the incorporated patents reference above in the Background of the Invention. The electromagnetic laser waves propagate along the close or re-entrant ring path 16A, 16B, 16C, 16D, 16E and 16F. FIG. 2 shows a laser medium gain curve with the position of the frequencies of the four waves indicated. Waves of frequency $f_1$ and $f_4$ circulate in the clockwise direction while waves of frequency $f_2$ and $f_3$ circulate in the counterclockwise direction. All four waves are preferably circularly polarized with waves of frequencies $f_1$ and $f_2$ being left-hand circularly polarized (LCP) and waves of frequencies $f_3$ and $f_4$ being right-hand circularly polarized (RCP).

Referring to FIG. 1, the ring laser path comprises a first section of ring segments 16A, 16E and 16F disposed in the XZ plane and a second section of ring segments 16B, 16C and 16D disposed in the YZ plane. Channel 28 is located at the intersection of these two planes. This non-planar ring inherently supports only circularly polarized waves without the use of a crystal rotator. The placement of reflectors 18–24 in the ring path 16A–16F produces a phase alteration which alters the resonant frequencies of the waves. The result, as shown in FIG. 2, is that the waves of left-hand circular polarization ($f_1$ and $f_2$) will have a resonant frequency different from the resonant frequency of the right-hand circular polarized waves ($f_3$ and $f_4$). This non-planar electromagnetic wave ring resonator is shown and described in U.S. Pat. No. 4,110,045 to Irl W. Smith, Jr. and Terry A. Dorschner and assigned to the present assignee.

Referring now to FIG. 3, a Faraday rotator 30 is shown in one segment of a ring laser path between reflectors 18 and 20. This non-reciprocal magneto-optical devices produces a phase delay bias for waves of either circular polarization sense traveling clockwise which is different from that for waves of similar polarization traveling counter-clockwise. The combination of reflectors 18–24 and the Faraday rotator 30 is such that the ring resonator supports waves having frequencies of oscillation as shown in FIG. 2. However, there are other alternative means for accomplishing the same results as the Faraday rotator. One such means utilizing the Zeeman effect is described in U.S. Pat. No. 4,229,106 to Terry Dorschner et al and assigned to the present assignee.

The laser gyroscope optical path 16A–16F is shown in FIG. 3 with connections to peripheral laser gyroscope electronics and optics. The high voltage power supply 34 provides a high negative voltage on the cathode 14 and a high negative voltage to the piezoelectric driver 38. Discharge control 36 electronics in the anode 12 line provides regulation of the current flowing from the anode to the cathode to a fixed and constant value; different gyro blocks require different values of cathode current depending on the optical losses within the particular gyro block.

The path length control system is a feedback network which maintains a consistent and optimum optical path length within the gyro cavity. It comprises the detector preamp 42, path length control 40 and high voltage piezoelectric driver 38 electronics. The optical path length is controlled by means of a reflector 22 which is mounted on a piezoelectric transducer (PZT) 31. The high voltage driver operates the PZT 31 with an applied voltage ranging from 0 volts to 400 volts. Since stable operating points or modes occur at path length intervals of one-half the laser wavelength, the mode which is closest to the center of the transducers dynamic range will normally be chosen as a permanent operating point. The detector preamplifier 42 separates the AC signals and DC signals received from the output optics 32. The DC signals are used for the path length control. The AC signals are sine waves representing the gyro output, and they are sent to the signal processor 44 where they are converted into two digital pulse streams ($f_1-f_2$ and $f_3-f_4$) with one pulse produced for each cycle within the incoming voltage waveforms. The path-length control is fully described in U.S. Pat. No. 4,108,553 to Albert N. Zampiello and Bradley J. Patch, Jr. and assigned to the present assignee. The specification of this patent being incorporated herein by reference.

The output optics 32 extracts a portion of each beam circulating within the laser cavity to produce the two output signals, $f_1-f_2$ and $f_3-f_4$, each one of which represents the difference in frequency between wave pairs having the same sense of circular polarization within the cavity as shown in FIG. 2. The output reflector 18 has a transmission coating on one side and a beamsplitter coating on the other side. Both coatings are a standard type using quarterwave stacks of $TiO_2$ and $SiO_2$. The beamsplitter coating transmits half the incident intensity and reflects the other half. A retroreflecting prism is used to heterodyne the two beams. This right angle prism is made of fused quartz and has silvered reflective faces. A dielectric coating is used between the silver and fused quartz to obtain minimal phase error upon reflection. A quarterwave plate followed by sheet polarizers are used to separate the four frequencies present in each beam. The wedge is used between the retroreflecting prism and the quarterwave plate to obtain the desired incident angle. A photodiode cover glass (antireflection coated on one side) and a photodiode package complete the output optics 32. An optical cement (which is cured using ultraviolet light) is used between the various interfaces to provide adhesion and to minimize reflections. The output optics is fully described in U.S. Pat. No. 4,141,651 to Irl W. Smith and Terry A. Dorschner and assigned to the present assignee, the specification of this patent being herein incorporated by reference.

The dispersion of the laser gain medium affects a ring laser gyroscope performance by static effects and moving medium effects. Static effects of path length control and temperature sensitivities of ring laser gyro bias due to dispersion can be eliminated by appropriate choice of a neon isotope mixture and a path length control intensity-mismatch servo control operating point. The most important moving medium effect is produced by the DC excited helium-neon gas discharge which results in frequency shifts of the lasing resonance referred to as Fresnel-Fizeau drag (FF-drag). This FF-drag effect results from the phenomenon of Langmuir flow, in which the heavy ions in a plasma are more strongly coupled to the walls of a gas discharge tube than are the electrons resulting in a net flow of gas down the center of the tube toward the cathode and a return flow along the walls in the opposite direction.

This invention provides an additional path or channel 28, as shown in FIG. 1, in the gyro block 10 whereby a low resistance, self-compensating, gas discharge current path, called the Z-path 16E, 28, and 16B, is established. The Z-path comprises two segments 16B and 16E of the laser ring path in series with channel 28. FIG. 3 shows that said Z-path provides for a single electrical discharge current I to flow in the same and opposite directions with respect to the laser waves resulting in the cancellation of the Fresnel-Fizeau drag effect.

Figure 4:
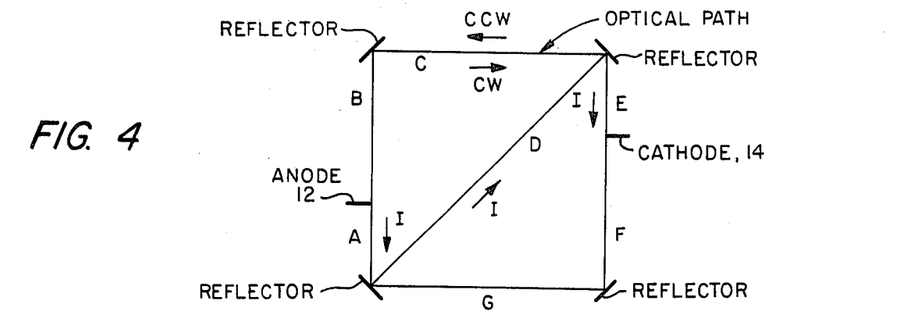
FIG. 4 is a diagram of a square ring laser gyroscope cavity design with a single self-compensating gas discharge path.

Referring now to FIG. 4, there are three possible discharge current paths electrically in parallel between anode 12 and cathode 14 in this square ring laser gyro diagram. They are paths BCE, AGF and ADE. For the conditions where C=G and A=E, BCE=AGF and the electrical characteristics of BCE will be the same as AGF. Therefore, the discharge must be established down the desired path ADE and not down an undesired BCE (or AGF). If during initiation of the discharge only one of these paths breaks down, then that path can be made stable by proper design of an external biasing circuit. If both the desired path and the undesired path break down, then the lower resistance path can be selected by the external biasing circuit provided the resistance of said paths are sufficiently different. This resistance requirement can be established by the appropriate selection of the desired discharge path geometry such as the path bore diameters and lengths.

The resistance requirement can be satisfied under the following condition: let r equal a weighting coefficient that depends on the geometry of path segment D relative to that of side C and weights the resistance of D relative to the resistance of side C, such that C=rD. The condition is satisfied for a desired discharge path of lower resistance than an undesired discharge path if $$A + rD + E < B + C + E$$

since C=A+B or B=C−A then, $$A + rD + E < C - A + C + E \text{ or}$$

$$A + rD + E < 2C + E - A$$

if A=E then, $$2A + rD < 2C$$

if D is such that $r = 1/\sqrt{2}$ and substituting for r and D where D=C/r, then $$2A + 1/\sqrt{2} \, (\sqrt{2} \, C) < 2C$$

$$2A + C < 2C$$

resulting in the boundary condition 2A=C.

Figure 5:
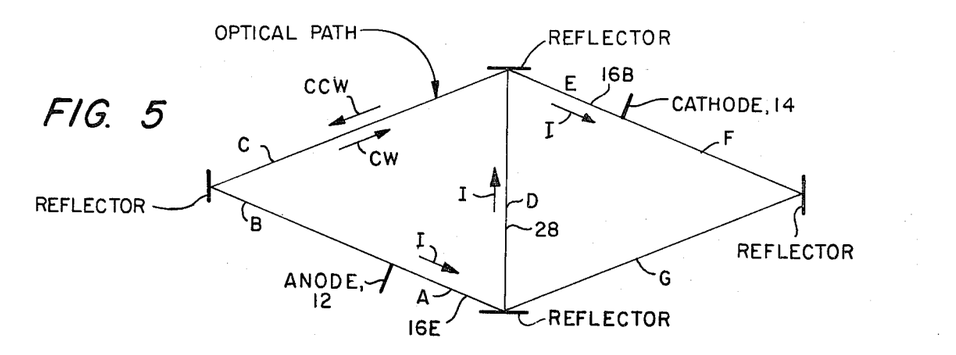
FIG. 5 is a diagram of a preferred quadrilateral ring laser gyroscope cavity design embodying the self-compensating gas discharge path.
Figure 6A:
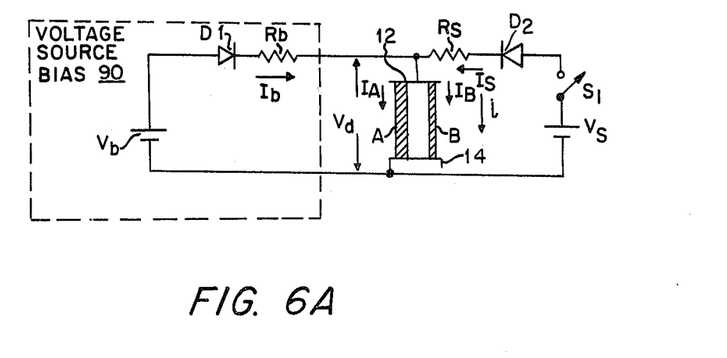
FIG. 6A is a schematic diagram for the gas discharge circuitry of a ring laser gyroscope utilizing a voltage source biasing network.
Figure 6B:
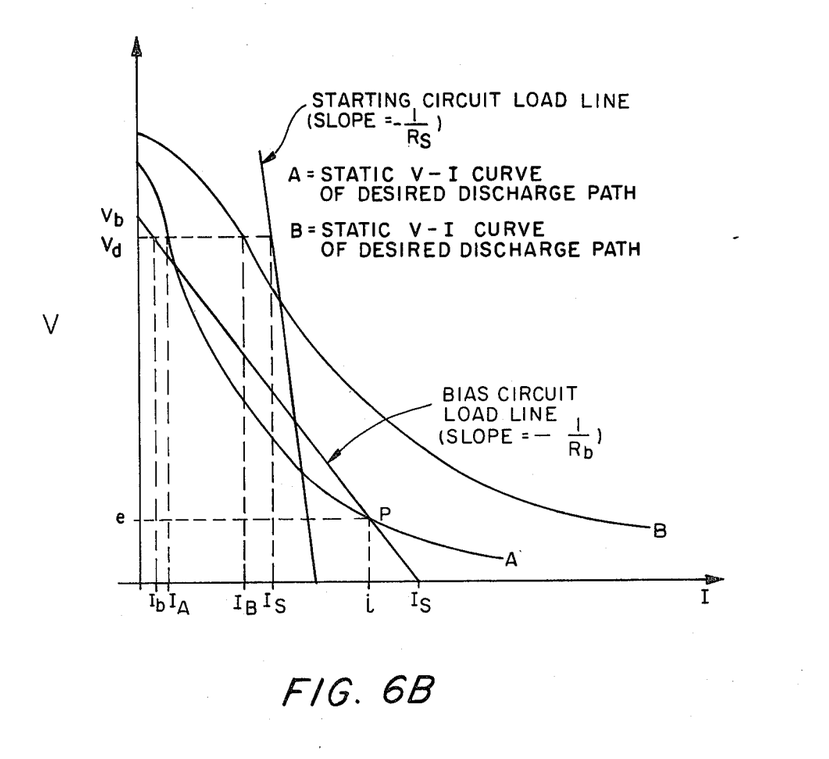
FIG. 6B is a plot of the voltage-current characteristic curves for the desired and undesired gas discharge paths with a load line selecting a stable operating point for the desired discharge path.

FIG. 5 shows a schematic representation of a skewed equilateral ring laser gyro configuration. The length of the discharge path that satisfies the aforesaid desired condition is as follows:

$$A + rD + E < B + C + E$$

if A=E and B=C−A then, $$A + rD + A < C - A + C + E$$

$$2A + rD < 2C$$

and if $r = 1/\sqrt{2}$ and D=C/r $$2A + 1/\sqrt{2} \, (\sqrt{2} \, C) < 2C$$

or 2A=C which is the same boundary condition as for the square gyro configuration as shown in FIG. 4. However, in FIG. 5, D can be made shorter than a side C, so that the resistance of D can be made equal to or less than the resistance of C making it possible to increase the length of ring segments A and E for increased laser gain advantages while maintaining an overall resistance that is less than the resistance of the undesired path. A biasing circuit for the discharge path is shown in FIG. 6A. The voltage source biasing network 90 comprises a voltage bias source $V_b$ in series with a current blocking diode D1 and a bias resistor $R_b$ which connects to the anode 12 of a discharge device. A starting voltage source $V_s$ is in series with one side of switch $S_1$ and the other side of said switch connects to a current blocking diode D2 in series with resistor $R_s$. The other side of resistors $R_s$ connects also to anode 12. The cathode 14 of the discharge device connects to the negative side of both voltage sources $V_b$ and $V_s$. Two possible discharge paths, A and B, are illustrated between anode 12 and cathode 14 along with their respective currents $I_A$ and $I_B$. A is the desired discharge path and B the undesired discharge path. The geometrical relationships for the discharge paths are such that their respective Voltage-Current (V−I) characteristics bear the relationship as shown in FIG. 6B.

Referring to FIG. 6A, if no discharge exists for t<0 and assuming the start voltage source $V_s$ is great enough to break down both paths A and B, then at t=0 when the switch is closed boths paths will break down and the resulting discharge current will be supplied by both $V_s$ and $V_b$. Both discharge paths A and B must run at the same discharge voltage $V_d$ where $I_b + I_s = I_A + I_B$. When the switch is opened, the desired discharge path will be maintained by the voltage bias source $V_b$ and the biasing resistor $R_b$ if the load line for this biasing circuit intersects the V−I curve of path A in FIG. 6B at a stable operating point. Two V−I curves are shown in FIG. 6B for paths A and B along with load lines for the start and biasing networks. The requirement for stability of the resultant circuit is that the biasing load line must intersect the V−I curve at a point whereby $R_b + (de/di) > 0$, where (de/di) is the slope of the V−I curve at the point of intersection. With the circuit of FIG. 6A, a stable discharge results with operation at point P in FIG. 6B with a discharge current equal to "i" and a discharge voltage drop equal to "e". No intersection exists between the load line and curve B; therefore, no discharge can be maintained in this undesired path.

Figure 7A:
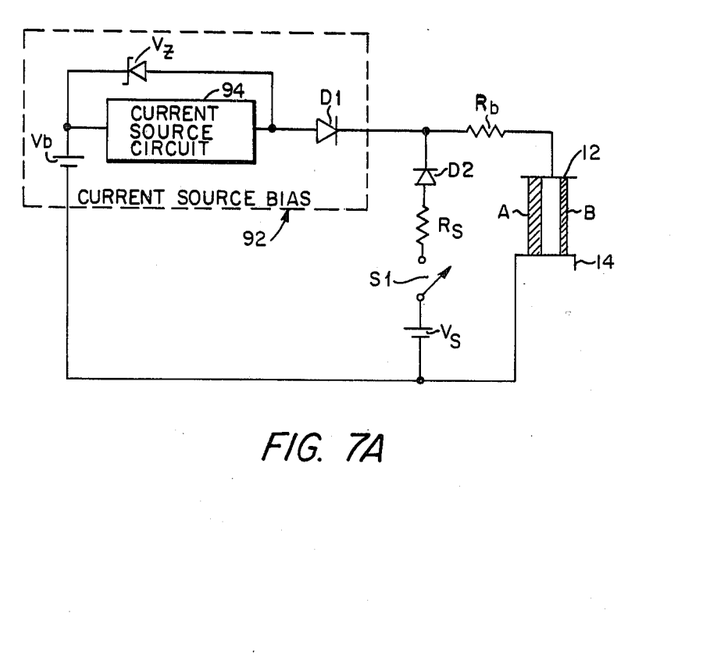
FIG. 7A is a schematic diagram for the gas discharge circuitry of a ring laser gyroscope utilizing a current source biasing network.
Figure 7B:
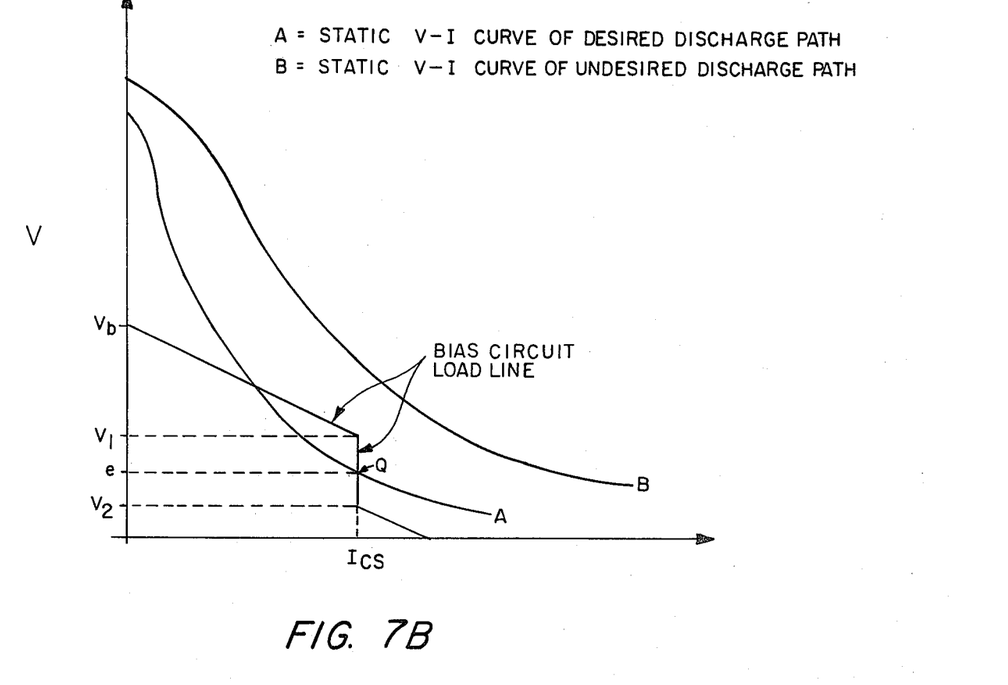
FIG. 7B is a plot of the voltage-current characteristic curves for the desired and undesired gas discharge paths with a load line selecting a stable operating point for the desired discharge path.

The voltage source biasing network 90 shown in FIG. 6A may be replaced by a current source biasing network 92 shown in FIG. 7A. A current source bias network is preferred for a laser gyro in order to control the current flowing through the laser path. This bias network consists of a voltage source $V_b$ in series with the parallel combination of a zener diode $V_z$ and non-ideal current source circuit 94 which when operating within its dynamic range produces a constant current $I_{cs}$. $V_z$ limits the maximum voltage across the current source to a safe value. Diode D1 in series with the current source is for reverse current blocking. Voltage source $V_s$ in series with switch $S_1$ and resistor $R_s$ provides the starting voltage for the discharge device. Diode D2 in series with $R_s$ is another reverse current blocking diode and resistor $R_b$ is the bias resistor establishing the proper operating load line. The dynamic range of the current source bias 92 is equal to $(V_1 - V_2)$ as shown in FIG. 7B. Beyond the dynamic range capability of the current source, that is for a voltage greater than $V_1$ or less than $V_2$ the biasing circuit resembles a voltage source and can be approximated by a voltage in series with the biasing resistance $R_b$. The biasing circuit shown in FIG. 7A will provide stable operation at point Q for the desired discharge path A after the start sequence.

Figure 8:
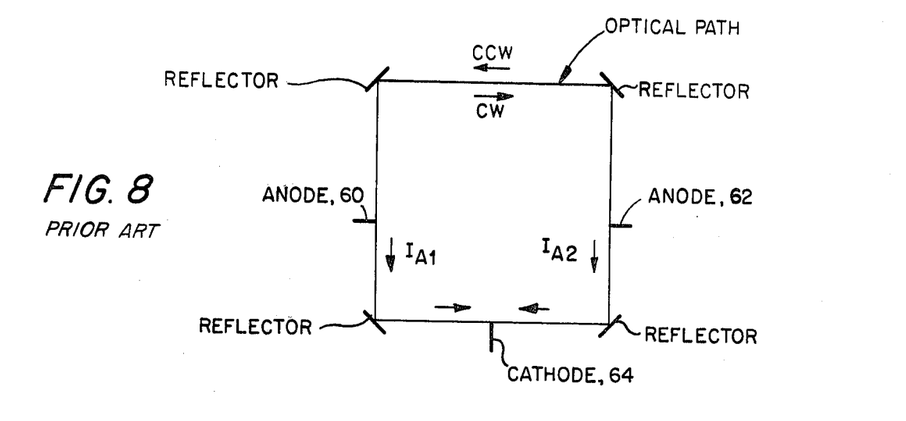
FIG. 8 is a diagram of a square ring laser gyroscope cavity design illustrating the prior art employing two anodes to provide two gas discharge paths.

FIG. 8 shows a prior art split discharge approach for canceling Fresnel-Fizeau drag effects using two anodes 60 and 62 and one cathode 64. A precise electronic current source is required to maintain equality of the electric discharge currents $I_{A1}$ and $I_{A2}$ in each anode to cathode path. These currents must be precisely matched over temperature. The clockwise (cw) and counterclockwise (ccw) traveling light waves sample both of the gas flows set up by the discharge currents $I_{A1}$ and $I_{A2}$. Since the currents flow in opposite-direction in each anode to cathode path relative to the directions of the traveling light waves, the FF-drag effect of one tends to cancel the FF-drag effect of the other. However, the present invention provides the improvements of not requiring two precisely matched currents and needing only one-half of the total cathode current ($I_{A1}+I_{A2}$) to maintain the same optical gain for a ring laser gyro. As shown in FIG. 5, only one discharge current path 16E, 28 and 16B, the Z-path, exists made of segments A+D+E. This reduced cathode current improvement results in a one-half reduction in the size of the cathode area permitting the construction of smaller cathodes and, therefore, a smaller laser gyro optical assembly or block.

Figure 9:
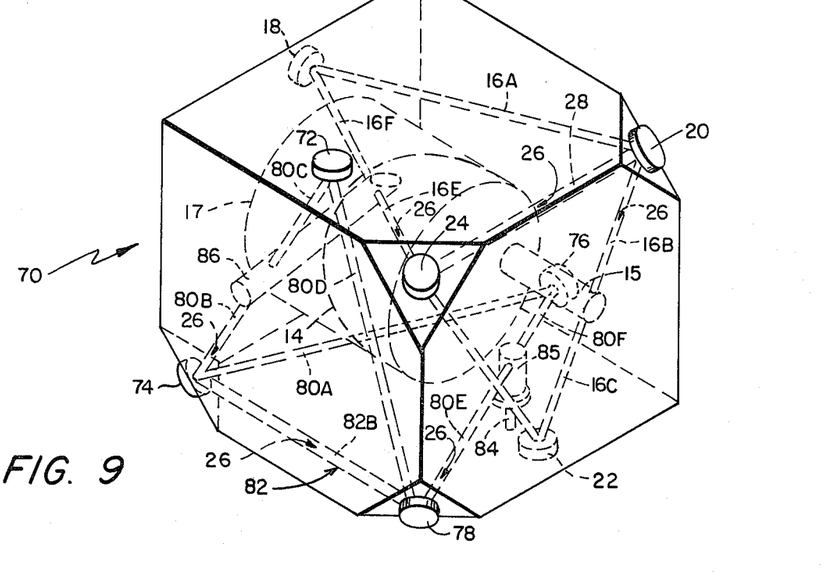
FIG. 9 is an isometric drawing of a dual axes ring laser gyroscope optical block embodying the invention in each ring which are interconnected, providing a single gas discharge current flow from one anode to one cathode.

Referring now to FIG. 9, the self-compensating Z-path discharge current approach also allows for reducing the number of electrodes required for a multi-axes gyro. For example, as shown in FIG. 9, a two-axes skewed equilateral ring laser gyro in a single block structure 70 utilizes one anode and one cathode. A first laser ring 16A–16F with Z-path 16E, 28, 16A shown in FIG. 1 is included in gyro block 70 as shown in FIG. 9 along with a second laser ring defined by the ring segments 80A, 80B, 80C, 80D, 80E and 80F which also has a discharge current Z-path defined by ring segments 80B and 80E in series with channel 82. A laser gain medium 26 having a helium-neon gas mixture as described hereinbefore is provided in said laser ring paths. The block 70 comprising said first ring and said second ring includes only one anode 84 along with an anode bore 85 and one cathode 14 inside a cathode cavity 17, and cathode bore 15. An additional bore 86 provides an interconnect pah between said first ring and said second ring permitting a single discharge current to flow from anode 84 to cathode 14 via discharge paths 85, 80E, 82, 80B, 86, 16E, 28, 16B and 15. Said second ring 80A–80F comprises four reflectors 72, 74, 76 and 78 for producing laser waves in said second ring path. It also comprises a magneto-optical device (not shown) such as a Faraday rotator as described hereinbefore for said first ring. The FF-drag effect is cancelled in said second laser ring 80A–80F by the discharge current flowing from anode 84 to cathode 14 through opposite directions in laser path segments 80E and 80B relative to the direction of the traveling light waves in said segments, and said discharge current is sufficient to maintain the optical gain of each ring within the two-axes ring laser gyro. The important improvement of using a single discharge current path in a multiple axes gyro block is that at least two rings can be included in the same size gyro block as a single axis ring laser gyro and the same size cathode can be used as in said single axis laser gyro block.

Figure 10:
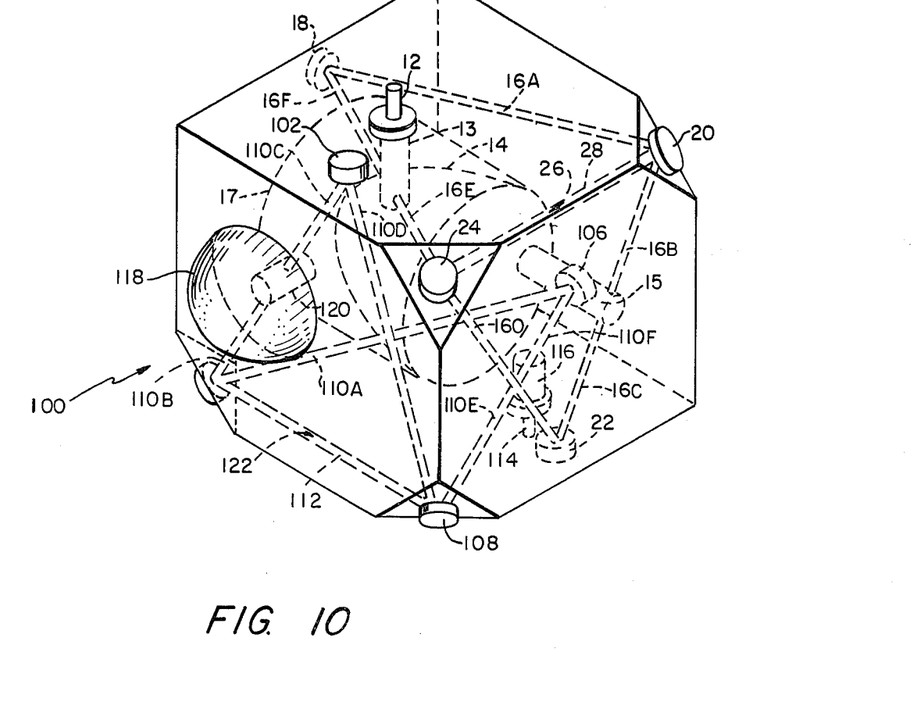
FIG. 10 is an isometric drawing of two separate ring laser closed paths located in the same optical block employing the invention in each nonplanar ring.

Referring now to FIG. 10, two independent, nonplanar, laser gyro rings are shown in a single block structure 100. This gyro block is similar to the gyro block illustrated in FIG. 1 showing only one laser ring 16A–16F, except in this instance, a second independent laser ring 110A–110F is included in the block comprising four reflectors 102, 104, 106 108, anode 114, anode bore 116, cathode 118 and cathode bore 120. In addition, said second laser ring has a discharge current Z-path between anode 114 and cathode 118 defined by ring segments 110B and 110E in series with channel 112. A laser gain medium 122 is also provided in said second ring comprising a mixture of helium-neon gas as described hereinbefore.

The multi-frequency operation of each ring laser shown in FIG. 10 is the same as described hereinbefore for the single ring laser in FIG. 1. Although not shown in FIG. 10, non-reciprocal magneto-optical device, such as a Faraday rotator 30 as shown in FIG. 3 and described previously, is a necessary element of each of the ring laser closed paths illustrated in FIG. 10 and known to one of ordinary skill in the art. An advantage of a gyro block with two independent ring lasers, as shown in FIG. 10, compared to a gyro block with two ring lasers interconnected for a single discharge current flow requiring only one anode and one cathode, as shown in FIG. 9, is that higher reliability is achieved through the use of redundancy.

This concludes the description of the preferred embodiment of the invention. However, many modifications and alterations will be obvious to one of ordinary skill in the art without departing from the spirit and scope of the inventive concept. Therefore, it is intended that the scope of this invention be limited only by the appended claims.

What is claimed is:

1. In combination:
   means for providing a closed path for supporting a pair of waves traveling through a gain medium in opposite directions; and
   means for producing an electrical discharge current in said medium, and for directing said discharge current in portions of said closed path, one wave of said pair of waves encountering said discharge current in the same direction in a first portion of said closed path and in the opposite direction in a second portion of said closed path, and the other wave of said pair of waves encountering said discharge current in the opposite direction in said first portion of said closed path and in the same direction in said second portion of said closed path.

2. The combination in accordance with claim 1 wherein:
   said directing means comprises channel means for interconnecting said first and second portions of said closed path.

3. In combination:
   means for providing a closed path for supporting a pair of waves traveling through a gain medium in opposite directions, a first section of said waves disposed in a first plane and a second section of said waves disposed in a second intersecting plane;
   means for exciting said gain medium by producing an electrical discharge current in said medium between an anode and a cathode; and
   a channel means disposed along an intersection of said first and second intersecting planes for directing said discharge current in portions of said closed path, one wave of said pair of waves encountering said discharge current in the same direction in a first portion of said closed path and in the opposite direction in a second portion of said closed path, and the other wave of said pair of waves encountering said discharge current in the opposite direction in said first portion of said closed path and in the same direction in said second portion of said closed path.

4. The combination in accordance with claim 3 wherein:
a first end of said channel means is coupled to said first portion of said closed path in said first plane at said intersecting plane and a second end of said channel means is coupled to said second portion of said closed path in said second plane at said intersecting plane providing a path between said anode and said cathode for said discharge current to pass.

5. In combination:
means for providing at least two closed paths, each of said paths comprising a pair of waves traveling in opposite directions through a gain medium;
means for exciting said gain medium in each of said closed paths by producing an electrical discharge current in a predetermined direction;
means for directing said discharge current in each of said closed paths, one wave of said pair of waves in each of said closed paths encountering said discharge current in the same direction in a first portion of each of said closed paths and in the opposite direction in a second portion of each of said closed paths, and the other wave of said pair of waves in each of said closed paths encountering said discharge current in the opposite direction in said first portion of each of said closed paths and in the same direction in said second portion of each of said closed paths; and
means for interconnecting said closed paths with said discharge current passing between said closed paths and between an anode and a cathode.

6. In combination:
means for providing at least two closed paths, each of said paths comprising a pair of waves traveling in opposite directions through a gain medium, a first section of said waves in each of said closed paths disposed in a first plane and a second section of said waves disposed in a second intersecting plane;
means for exciting said gain medium in each of said closed paths by producing an electrical discharge current in a predetermined direction;
a channel means disposed along the intersection of said first and second intersecting planes in each of said closed paths for directing said discharge current from a first portion in each of said closed paths to a second portion, one wave of each of said pair of waves encountering said discharge current in the same direction in said first portion of said closed paths and in the opposite direction in said second portion of said closed paths, and the other wave of each of said pair of waves encountering said discharge current in the opposite direction in said first portion of said closed paths and in the same direction in said second portion of said closed paths; and
means for interconnecting said closed paths with said discharge current passing between said closed paths and between an anode and a cathode.

7. In combination:
block means for producing at least two closed paths, each of said paths comprising a pair of waves traveling in opposite directions through a gain medium;
means for producing an electrical discharge current between an anode and a cathode coupled to each of said closed paths, and means for directing said discharge current in each of said closed paths, one wave of said pair of waves in each of said closed paths encountering said discharge current in the same direction in a first portion of each of said closed paths and in the opposite direction in a second portion of each of said closed paths, and the other wave of said pair of waves in each of said closed paths encountering said discharge current in the opposite direction in said first portion of each of said closed paths and in the same direction in said second portion of each of said closed paths.

8. A laser gyroscope comprising:
block means for producing at least two closed paths, each of said paths comprising at least two pairs of waves, said waves of each pair traveling in opposite directions through a gain medium, a first section of said waves in each of said closed paths disposed in a first plane and a second section of said waves disposed in a second intersecting plane;
means for exciting said gain medium in each of said closed paths by producing an electrical discharge current in a predetermined direction between an anode and a cathode coupled to each of said closed paths; and
a channel means disposed along the intersection of said first and second intersecting planes in each of said closed paths for directing said discharge current from a first portion in each of said closed paths to a second portion, one wave of each of said pair of waves encountering said discharge current in the same direction in said first portion of said closed paths and in the opposite direction in said second portion of said closed paths, and the other wave of each of said pair of waves encountering said discharge current in the opposite direction in said first portion of said closed paths and in the same direction in said second portion of said closed paths, and a first end of said channel means in each of said closed paths is coupled to said first portion in said first plane at said intersecting plane and a second end of said channel means in each of said closed paths is coupled to said second portion in said second plane at said intersecting plane providing a path between said anode and said cathode for said discharge current to pass.

9. A laser gyro comprising:
means for providing a closed path with at least two pairs of waves passing through a gain medium, said waves of each pair traveling in opposite directions through the gain medium with a section of said waves disposed in a first plane and a second section of said waves disposed in a second intersecting plane;
means for exciting said gain medium by producing an electrical discharge current in said gain medium between an anode and a cathode; and
a channel means disposed along an intersection of said first and second intersecting planes for directing said discharge current from a first portion of said closed path to a second portion of said closed path, one wave of each of said pair of waves encountering said discharge current in the same direction in said first portion of said closed path and in the opposite direction in said second portion of said closed path, and the other wave of each of said pair of waves encountering said discharge current in the opposite direction in said first portion of said closed path and in the same direction in said second portion of said closed path.

10. A laser gyroscope comprising:

means for providing at least two closed paths, each of said paths comprising at least two pairs of waves passing through a gain medium, said waves of each pair traveling in opposite directions through the gain medium with a first section of said waves in each of said closed paths disposed in a first plane and a second section of said waves disposed in a second intersecting plane;

means for exciting said gain medium in each of said closed paths by producing an electrical discharge current in a predetermined direction;

a channel means disposed along the intersection of said first and second intersecting planes in each of said closed paths for directing said discharge current from a first portion in each of said closed paths to a second portion, one wave of each of said pair of waves encountering said discharge current in the same direction in said first portion of said closed paths and in the opposite direction in said second portion of said closed paths, and the other wave of each of said pair of waves encountering said discharge current in the opposite direction in said first portion of said closed paths and in the same direction in said second portion of said closed paths; and means for interconnecting said closed paths with said discharge current passing between said closed paths and between an anode and a cathode.

* * * * *

UNITED STATES PATENT OFFICE
CERTIFICATE OF CORRECTION

Patent No. 4,397,027          Dated   August 2, 1983

Inventor(s)  Albert N. Zampiello; James B. Matthews

It is certified that error appears in the above-identified patent and that said Letters Patent are hereby corrected as shown below:

Column 1, line 38:   Change "lefthand" to --left-hand--;

Column 4, line 64:   Change "close" to --closed--;

Column 5, line 28:   Change "devices" to --device--;

Column 5, line 53:   Change "compries" to --comprises--;

Column 8, line 55:   After "bias resistor" insert --for--;

Column 9, line 16:   After "made" insert --up--.

Signed and Sealed this

Tenth Day of July 1984

[SEAL]

Attest:

Attesting Officer

GERALD J. MOSSINGHOFF

Commissioner of Patents and Trademarks